(12) United States Patent  
McCauley

(10) Patent No.: US 9,072,290 B1  
(45) Date of Patent: Jul. 7, 2015

(54) PORTABLE HUNTING BLIND

(71) Applicant: Ira D. McCauley, Defiance, MO (US)

(72) Inventor: Ira D. McCauley, Defiance, MO (US)

( * ) Notice: Subject to any disclaimer, the term of this patent is extended or adjusted under 35 U.S.C. 154(b) by 65 days.

(21) Appl. No.: 14/142,773

(22) Filed: Dec. 28, 2013

Related U.S. Application Data

(60) Provisional application No. 61/746,622, filed on Dec. 28, 2012.

(51) Int. Cl.
*A47C 7/62* (2006.01)
*A01M 31/02* (2006.01)

(52) U.S. Cl.
CPC .................... *A01M 31/025* (2013.01)

(58) Field of Classification Search
CPC ................. A47C 7/66; A01M 31/025
See application file for complete search history.

(56) References Cited

U.S. PATENT DOCUMENTS

| | | | |
|---|---|---|---|
| 2,959,796 A | 11/1960 | De Sander | |
| 3,509,891 A | 5/1970 | De Bolt | |
| 3,622,201 A | 11/1971 | Radig | |
| 3,886,678 A * | 6/1975 | Caccamo | 43/1 |
| 4,106,145 A | 8/1978 | Gillen et al. | |
| 4,110,941 A * | 9/1978 | Scott | 52/66 |
| 4,751,936 A | 6/1988 | Zibble et al. | |
| 4,788,997 A | 12/1988 | Clopton | |
| 4,915,120 A | 4/1990 | Ziolkowski | |
| 4,971,089 A | 11/1990 | Braman | |
| 4,979,456 A | 12/1990 | Steward | |
| 5,135,281 A | 8/1992 | Pappalardo | |
| 5,240,020 A * | 8/1993 | Byers | 135/96 |
| 5,647,159 A * | 7/1997 | Latschaw | 43/1 |
| 6,296,002 B1 | 10/2001 | Tashchyan | |
| 6,769,442 B2 * | 8/2004 | Johnson | 135/96 |
| 6,789,557 B1 | 9/2004 | Wahl, Jr. | |
| 7,311,355 B2 | 12/2007 | Fargason, III | |
| 7,314,399 B2 | 1/2008 | Turner | |
| 7,527,331 B2 | 5/2009 | Fargason, III | |
| 7,712,437 B2 | 5/2010 | Leung | |
| 7,909,395 B2 | 3/2011 | Reeb et al. | |
| 7,997,291 B2 | 8/2011 | Gressette, III et al. | |
| 8,042,865 B2 | 10/2011 | Fargason, III | |
| 8,585,135 B2 | 11/2013 | Wilson | |
| 2002/0112752 A1 | 8/2002 | Blakney | |
| 2003/0046855 A1 | 3/2003 | Bergdall | |
| 2006/0284457 A1 | 12/2006 | Holley | |
| 2010/0237665 A1 | 9/2010 | Grace | |

* cited by examiner

*Primary Examiner* — Philip Gabler
(74) *Attorney, Agent, or Firm* — Grace J. Fishel

(57) ABSTRACT

A portable hunting blind including a chair and a canopy frame draped with a cover. A spring interconnects the chair and the canopy frame for rotating the canopy frame backwardly so that the cover is no longer above the seat of the chair. A quick spring release triggered by a user with his elbow or arm is provided on an arm rest of the chair. In the moment that the canopy frame is rotated, the user may take a shot from a seated or standing position in the blind.

10 Claims, 8 Drawing Sheets

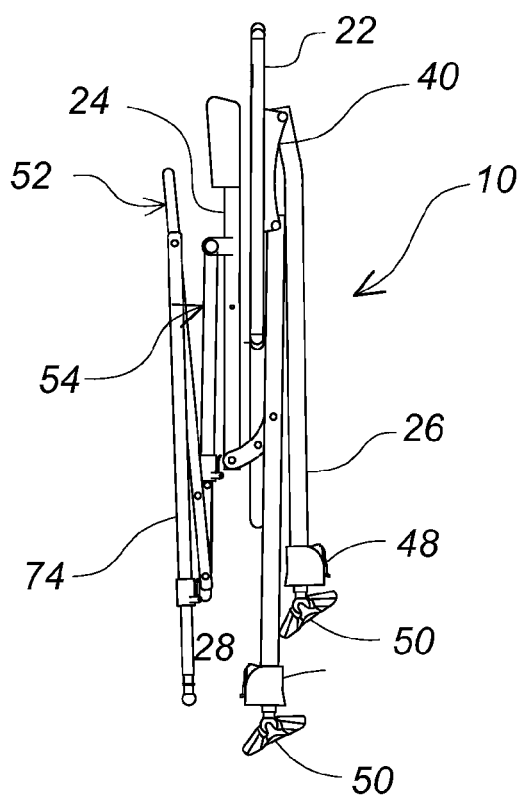
Fig. 7
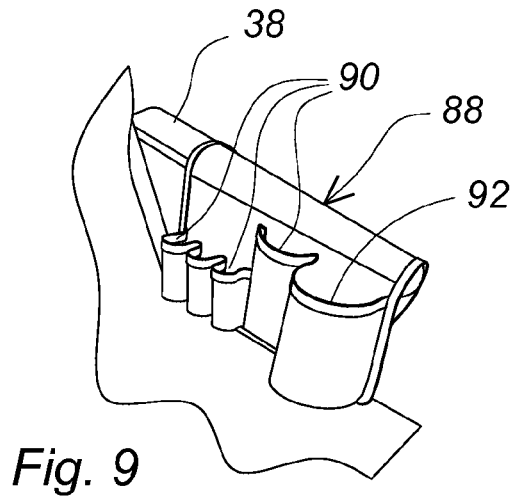
Fig. 9
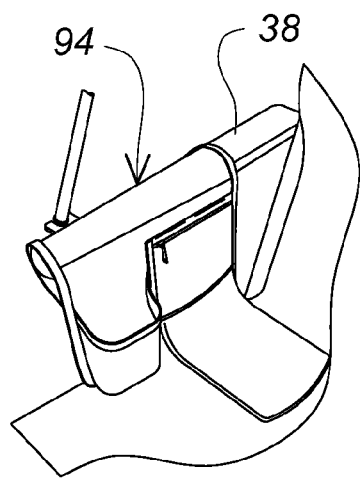
Fig. 10
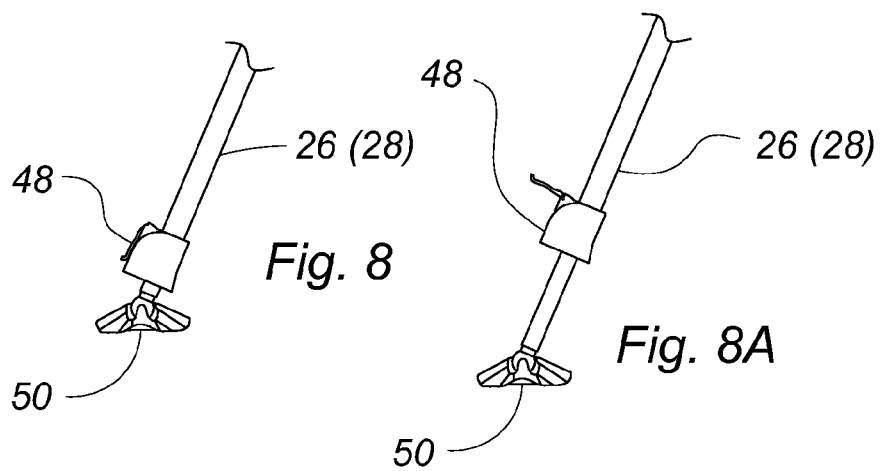
Fig. 8
Fig. 8A

PORTABLE HUNTING BLIND

BACKGROUND OF THE INVENTION

1. Field of the Invention

The present invention relates to a portable hunting blind with a spring released canopy and is particularly adapted to hunting waterfowl and upland game birds.

2. Brief Description of the Prior Art

For best success in hunting birds, a hunter must go where the birds are, be capable of remaining camouflaged nearly motionless for long periods of time and be positioned to make an effective shot when the opportunity arises. This combination of requirements becomes more difficult to achieve as hunters age because of mobility issues. Quality of experience is also important which includes comfort and being able to view the surrounding area.

Pit and stake blinds are commonly used in hunting waterfowl but they are permanent structures and cannot be easily relocated if the birds change locations. In addition, a hunter must be in physical condition to stand up quickly to make a safe shot. In hunting waterfowl, a swamp seat is portable but it provides no concealment. A layout boat is mobile and provides concealment but the hunter must be in physical condition to sit up quickly to make a shot; which is the same issue with layout blinds. There are also portable canopy blinds for use in upland game bird hunting but the canopy gets in the way of an unobstructed shot.

Hence none of the above blinds have the desired combination of features mentioned above as being desirable.

BRIEF SUMMARY OF THE INVENTION

In view of the above, it is an object of the present invention to provide a portable hunting blind which may be used for both field and waterfowl hunting. It is another object to provide a hunting blind that allows a hunter to take a shot from a seated or standing position. It is also an object to provide a hunting blind that comfortably conceals a hunter while allowing the hunter to see what is going on around him. Other objects and features of the invention will be in part apparent and in part pointed out hereinafter.

In accordance with the present invention, a portable hunting blind includes a chair, a canopy frame, a spring, a release mechanism and a cover wherein:

(1) The chair has a seat, a backrest, arm rests and front and rear chair legs with the seat and back formed of U-shaped members having a base and legs. The legs of the backrest are connected to the legs of the seat forward of the base of the seat.

(2) The canopy frame has a support and a top formed of U-shaped members having a base and legs with the legs of the support joined to the legs of the backrest and with the legs of the top joined to the legs of the support near the base of the support to form a hoop.

(3) The spring interconnects the base of the seat and the support with the spring being in tension when the support is pivoted upwardly such that it is generally in line with the backrest and the top is pivoted such that it is generally normal to the support and positioned above the seat.

(4) The release mechanism includes a support rod pivoted to the top and a latch on one of the arm rests. The latch holds the spring in tension when locked onto a free end of the support rod.

(5) The cover draped over the canopy frame envelopes the canopy frame and the chair.

In use a user seated in the chair may release the latch by pushing against the rod with his arm or elbow thus releasing the spring which rotates the canopy frame backwardly so that the cover draped top is no longer above the seat, in which moment the hunter may take a shot either from a seated or standing position.

In some embodiments, there are a pair of overlapping dome support rods pivoted in the hoop formed by the top and the base of the support and the cover draped over the dome support rods is formed of mesh such that the user may view his surroundings through the mesh. Other embodiments for example may include one or more of the following representative but not exhaustive features, (i) The support rod pivoted to the top is generally parallel to the spring interconnecting the base of the seat and the support when the spring is in tension. This arrangement improves spring action.

(ii) The front and rear chair legs, the legs of the U-shaped support and the support rod are independently adjustable in length.

(iii) A cross brace interconnects the legs of the U-shaped support near the base of the support for the purpose of providing a first attachment point for the spring with the cross brace between the legs of the U-shaped support providing a second attachment point for the spring.

(iv) The base of the U-shaped seat, backrest, support and top is generally flat with the legs generally at a right angle thereto.

(v) The latch has a throat normal to the arm rest into which a ball on a free end of the support rod is received holding the spring in tension.

(vi) A safety strap connects the base of the backrest and the cross-brace between the legs of the support for stopping rotation of the legs of the support about the legs of the backrest at less than 180 degrees such that the U-shaped top cover and cover are kept out of water.

(vii) The cover has bands on the outside of the cover for attachment of grass or stalks.

(viii) The legs of the backrest nest inside the legs of the seat and the legs of the support nest inside the legs of the top.

(ix) The front and rear chair legs on right and left sides of the chair are pivotally connected at their upper ends to the arm rest by a hinge fitting.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which:

FIG. 7 is a side elevation showing the portable hunting blind in folded condition;

FIG. 8 is a detail on an enlarged scale taken along line 8-8 in FIG. 6 showing a leg of the chair in shortened condition;

FIG. 8A is a detail like FIG. 8 showing the leg in extended condition;

FIG. 9 is a perspective view of a pouch with slots for duck and goose calls and for a drink;

FIG. 10 is a perspective view of a pouch for containing spent shells;

DETAILED DESCRIPTION OF THE INVENTION

Figure 1:
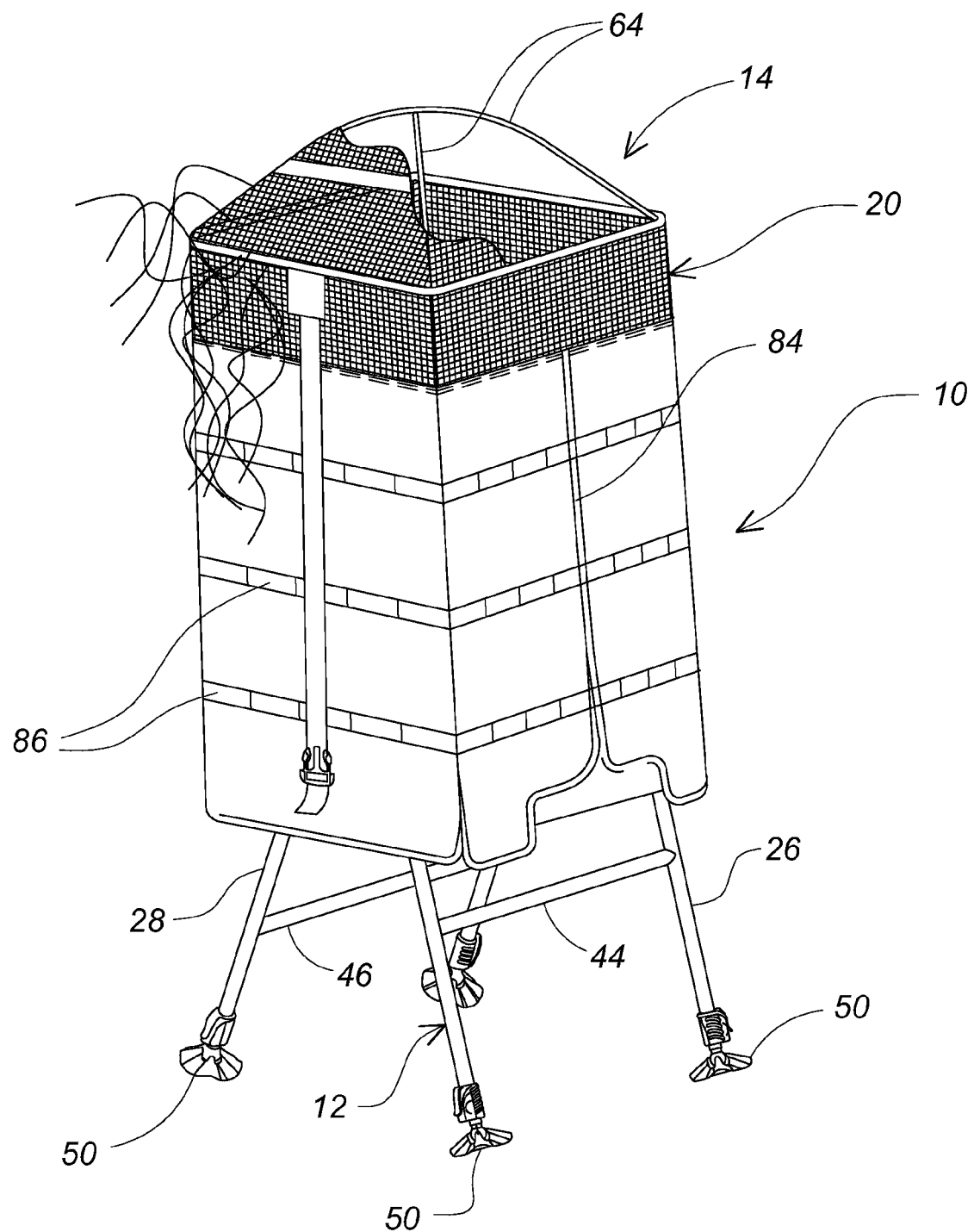
FIG. 1 is a perspective view of a portable hunting blind as disclosed herein including a chair, canopy frame, a quick release mechanism and a cover.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the drawings more particularly by reference character, a portable hunting blind 10 comprises a chair 12, a canopy frame 14, a quick release mechanism 16 for a spring member 18 and a cover 20. While chair 12 is illustrated in the form of a lawn or garden-type outdoor chair, it will be understood chair 12 may be incorporated into a float tube, layout blind or the like which are therefore a "portable hunting blind" within the scope of the present disclosure and claims. Chair 12 and canopy frame 14 are formed from a plurality of axial elongated structural members preferably fabricated from durable light weight tubular metal. The members can be aluminum tubing of circular or non-circular cross-section, such as extruded oval or elliptical tubing, and formed as one-piece or joined together with appropriate connecting elements as will occur to those skilled in the art.

Figure 4:
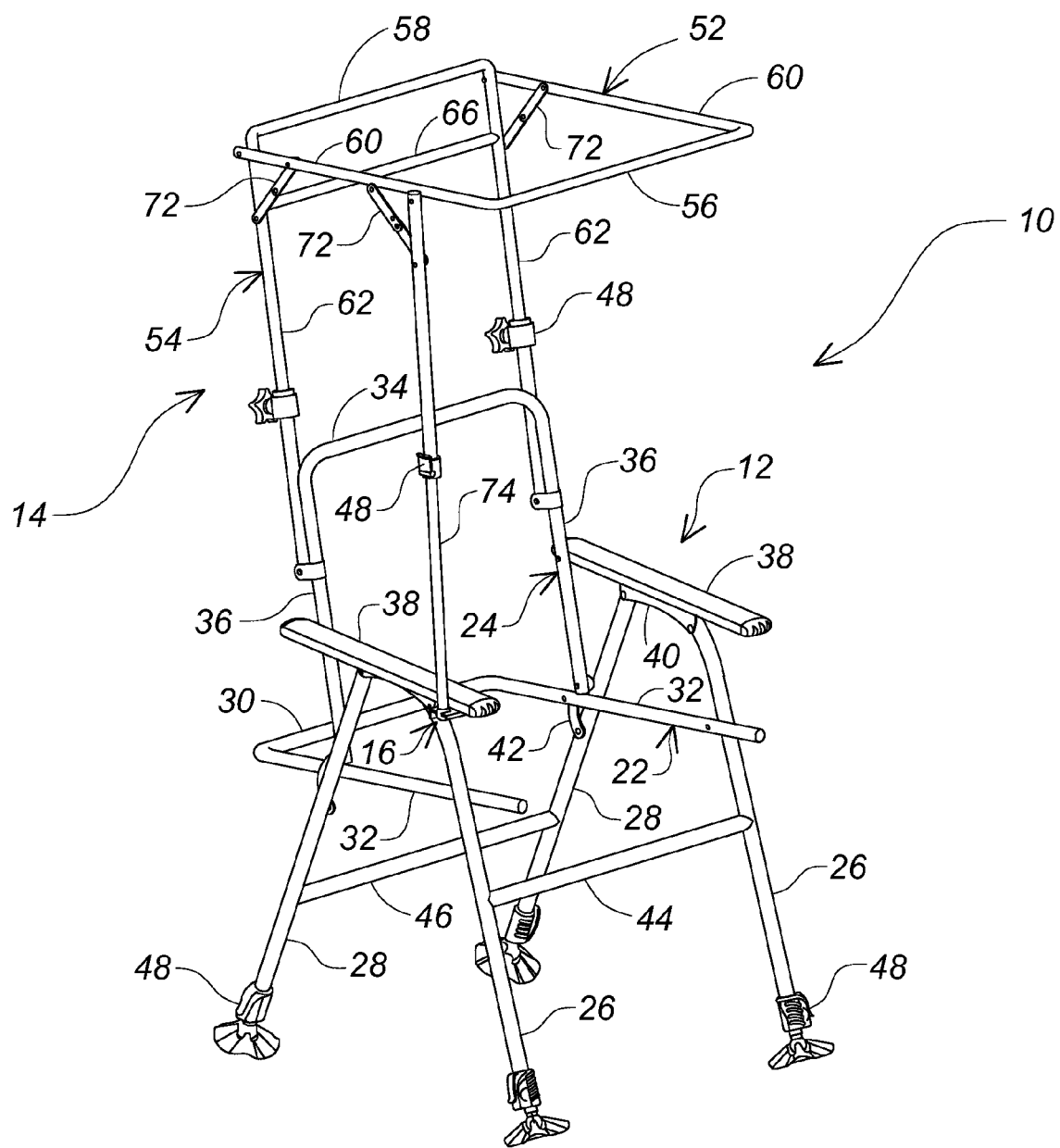
FIG. 4 is a perspective view showing the chair and canopy frame.

As best seen in FIG. 4, chair 12 has a U-shaped seat 22 and a U-shaped backrest 24 covered with a flexible material and connected to right and left front chair legs 26 and right and left rear chair legs 28. U-shaped seat 22 has a generally flat base 30 joined at right angles to legs 32. In like manner, U-shaped backrest 24 has a generally flat base 34 joined at right angles to legs 36. Legs 36 of U-shaped backrest 24 are pivoted to legs 32 of U-shaped seat 22 such that base 30 of the seat extends behind backrest 24 for use as a first attachment point for spring member 18.

Front chair legs 26 have a slight upward and rearward incline to the vertical when the chair is in set-up position while rear chair legs 28 have a light upward and forward incline. Front chair legs 26 and rear chair legs 28 are pivotally connected at their upper ends to an arm rest 38 by a hinge fitting 40. Each of front chair legs 26 is pivotally connected to a front end of U-shaped seat 22 along legs 32 while rear chair legs are pivotally connected to legs 32 by a curved support fitting 42 positioned inboard of base 30. The lower end of U-shaped backrest 24 is pivotally connected in upwardly offset relation to the upper end of curved support fitting 42 and each rear chair leg 28 is pivotally connected to the lower end of curved support fitting 42 as shown. A front and rear cross brace 44, 46, respectively, interconnects front chair legs 26 and rear chair legs 28, respectively. For use on uneven terrain or for use in shallow water, each of front chair legs 26 and rear chair legs 28 may be independently adjustable in length. For this purpose the distal end of each leg may be telescoped inside the upper end of each leg and held at a selected length, for example, with a spring loaded pin clamp 48 as shown in FIGS. 8 and 8A. A lily-pad foot 50 or the like may be attached to each distal end of the chair legs for the purpose of stabilizing the chair in mud, for example. Other types of folding chairs such as a beach chair, camp chair or the like may also be suitable. It is also contemplated that chair 12 may not fold although portability of the blind may be compromised.

Canopy frame 14 includes a U-shaped top 52 and a U-shaped support 54 with a generally flat base 56, 58 joined at right angles to legs 60, 62, respectively. The free ends of legs 60 of U-shaped top 52 are pivoted to legs 62 of U-shaped support 54 near base 58 such that U-shaped top 52 together with base 58 of U-shaped support 54 form a hoop. A pair of dome support rods 64 are diagonally pivoted inside hoop between the position shown in FIG. 1 and flat within the hoop as shown in FIG. 7. The free ends of legs 62 of U-shaped support 54 are pivoted to legs 36 of U-shaped backrest 24 below base 34. A cross base 66 joins legs 62 of U-shaped support 54 below base 58 as a second attachment point for spring member 18 and for a safety strap 68 as more particularly described below. Legs 62 of U-shaped support 62 telescope and may be held at a selected length with a spring loaded pin clamp 48 or the like such that the distance of U-shaped top 52 above U-shaped seat 22 may be adjusted to fit the preference of a user 70. U-shaped top 52 and U-shaped support 54 can be fixed at substantially a right angle to each other in erected condition and held in that position by diagonal folding braces 72.

Figure 5:
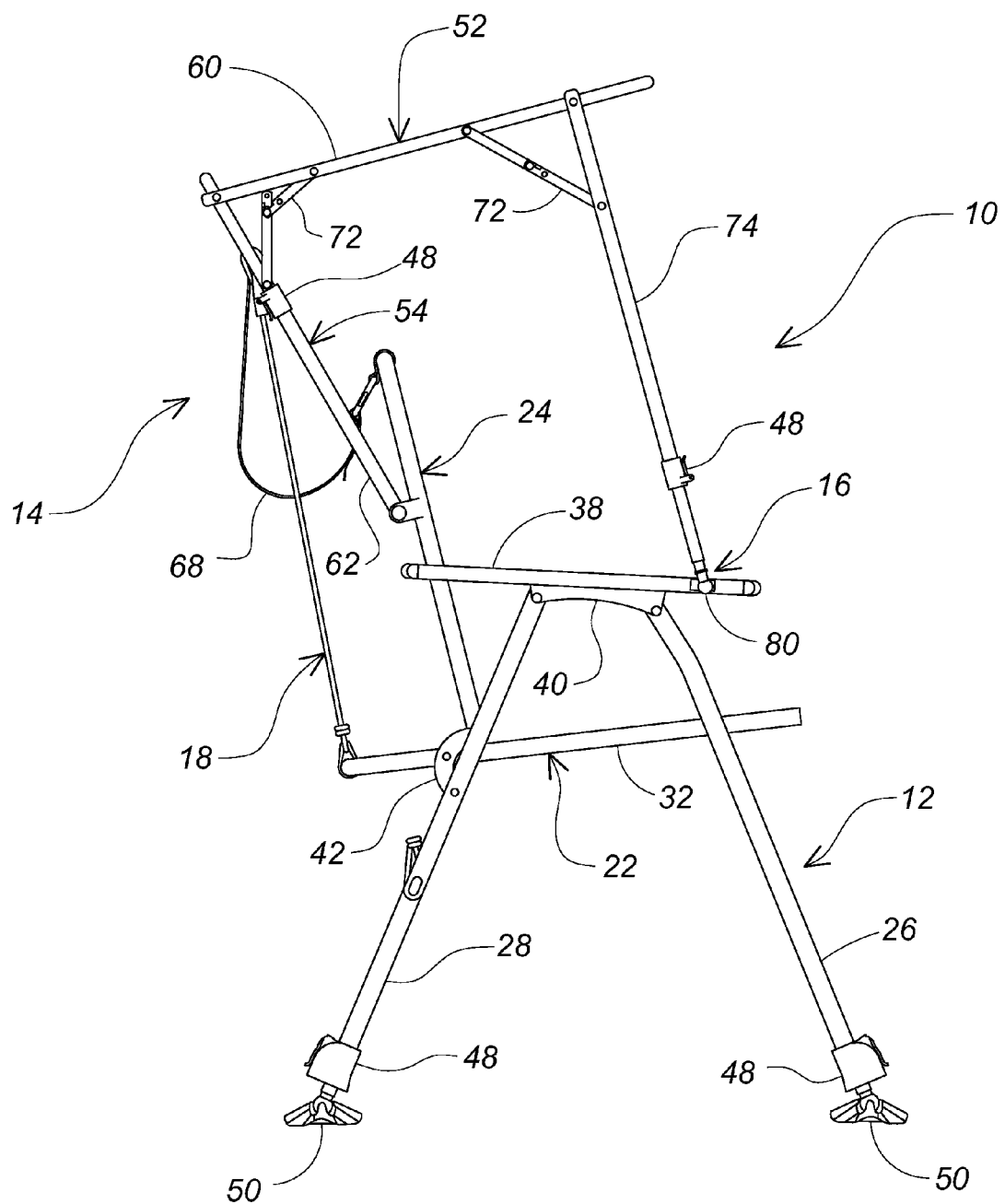
FIG. 5 is a side elevation showing the chair and canopy frame with the spring cocked.
Figure 6:
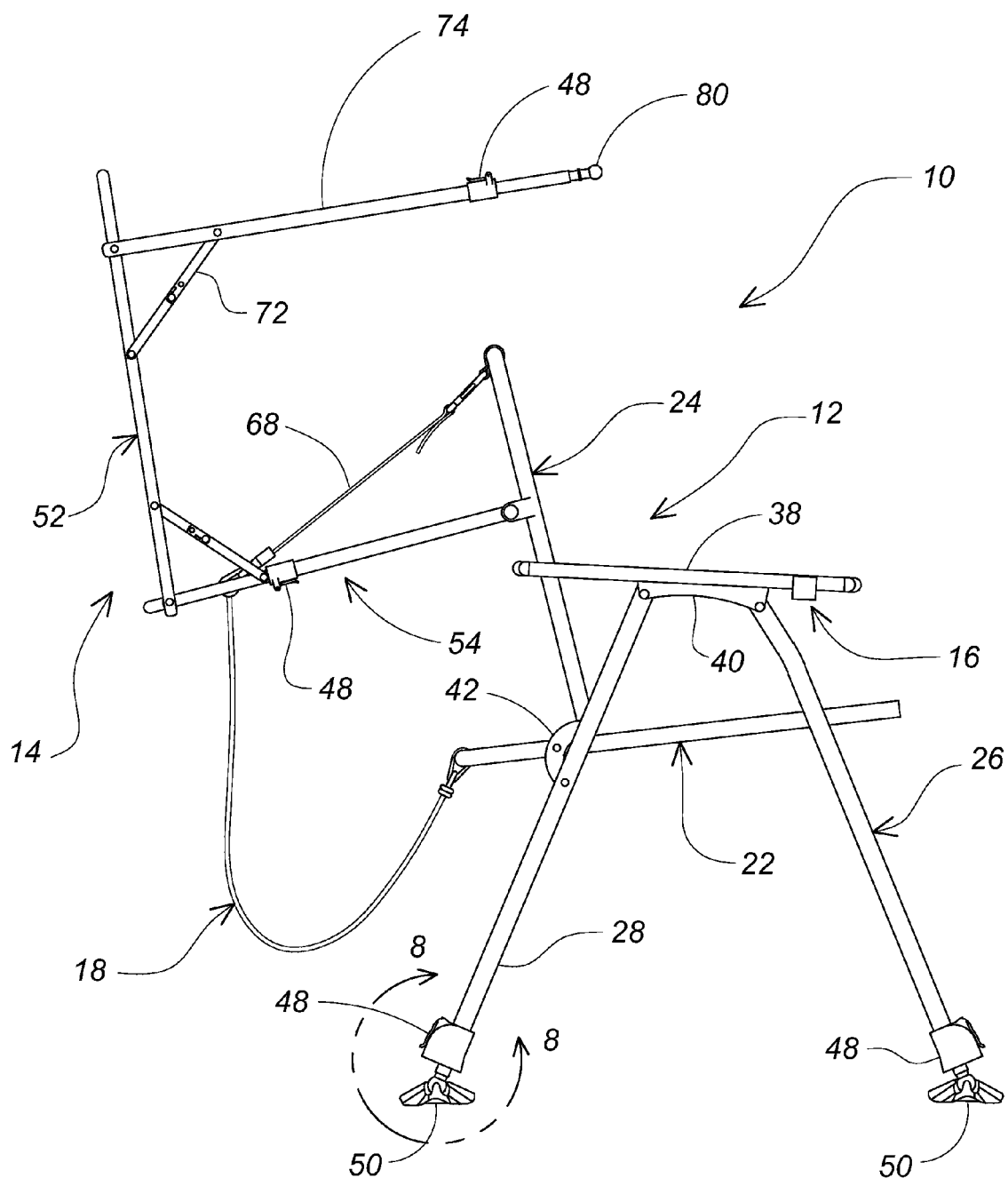
FIG. 6 is a side elevation showing the chair and canopy frame after the spring has been released.

For the purpose of spring loading canopy frame 14 when it is in a fully erected position as hereinafter described, spring member 18 is attached to cross brace 66 of U-shaped support 54 and to base 30 of U-shaped seat 22. Spring member 18 may be a pair of bungee cords or other elastic straps, an extension spring or the like. When canopy frame 14 is set-up in the position shown in FIGS. 1-5, spring member 18 is in an over-center or return position and exerts a pulling force causing canopy frame 14 to rotate about legs 36 of U-shaped backrest 24. As a result, canopy frame 14 will be quickly swung to a fully open position and unless stopped, legs 62 will rotate through substantially a fully 180 degree arc. When blind 10 is used in water, safety strap 68 stops legs 62 short of full rotation with U-shaped top out of the water. As illustrated in FIGS. 5-6, safety strap 68 is attached to cross brace 66 of U-shaped support 54 and to base 34 of U-shaped backrest 24.

Figure 11:
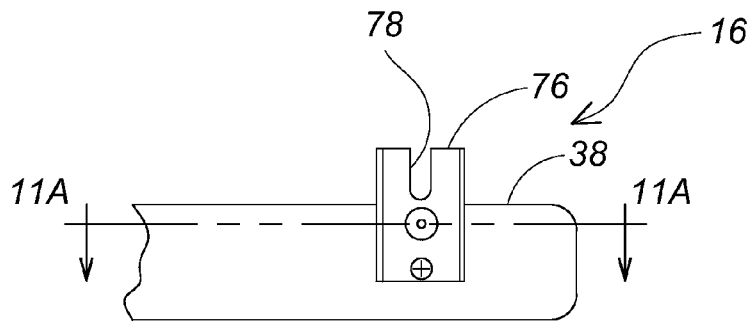
FIG. 11 is plan view of a latch installed under one of the chair's arm rests in latching position.
Figure 11A:
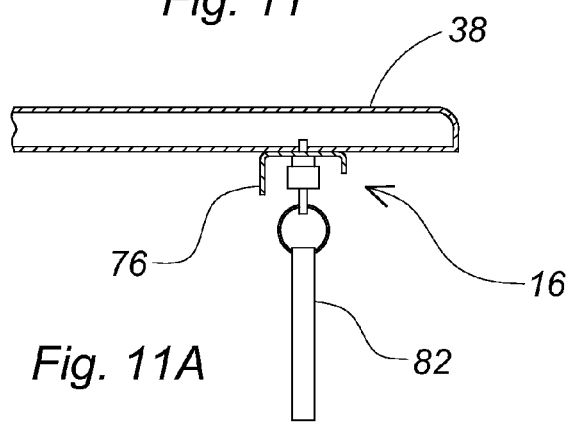
FIG. 11A is a cross section taken along the plane of 11A-11A in FIG. 11 showing a pin lock for holding the latch in latching position.
Figure 12:
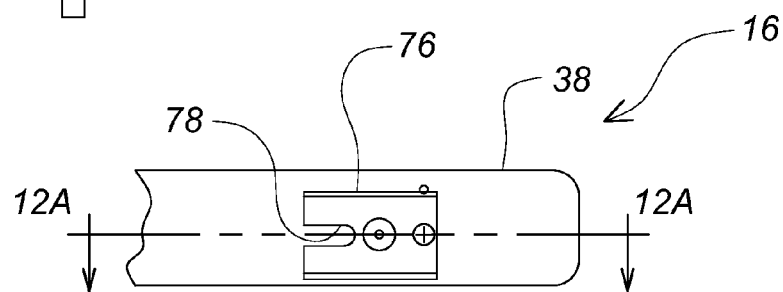
FIG. 12 is a plan view of the latch in stored position under the arm rest.
Figure 12A:
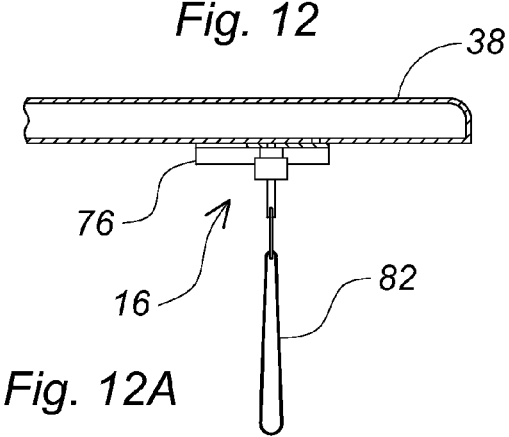
FIG. 12A is a cross section taken along the plane of 12A-12A showing the pin lock disengaged from the latch.

To prevent the premature rotation of canopy frame 14 about U-shaped backrest 24 in cocked position as shown in FIG. 5, release mechanism 16 is provided on arm rest 38. Release mechanism 16 includes a support rod 74 which is pivoted to one of legs 60 of U-shaped top 52 and a latch 76 which may be attached to an underside of arm rest 38. As illustrated, latch 76 has a throat 78 in which a ball 80 on the end of support rod 74 is received. Latch 76 may be pivotal from an in-line position as shown in FIG. 12 to a transverse position as shown in FIG. 11 for the purpose receiving ball 80. A pin lock 82 may be provided for securing latch 76 in transverse position. Other release mechanisms 16, as will occur to those skilled in the art, such as a trigger may be used to release support rod 74. In cocked position as shown in FIG. 5, support rod 76 is generally parallel to spring member 18.

Portable hunting blind 10 may be folded flat as shown in FIG. 7. To permit nesting of U-shaped backrest 24 in U-shaped seat 22 and U-shaped support 54 in U-shaped top 52 the dimension of base 34 of U-shaped backrest 24 is such that legs 36 pivot inside legs 32 of U-shaped seat 22. For similar purpose, the dimension of base 56 of U-shaped top 52 is such that legs 60 pivot outside legs 62 of U-shaped support 54 as does support rod 74.

Figure 2:
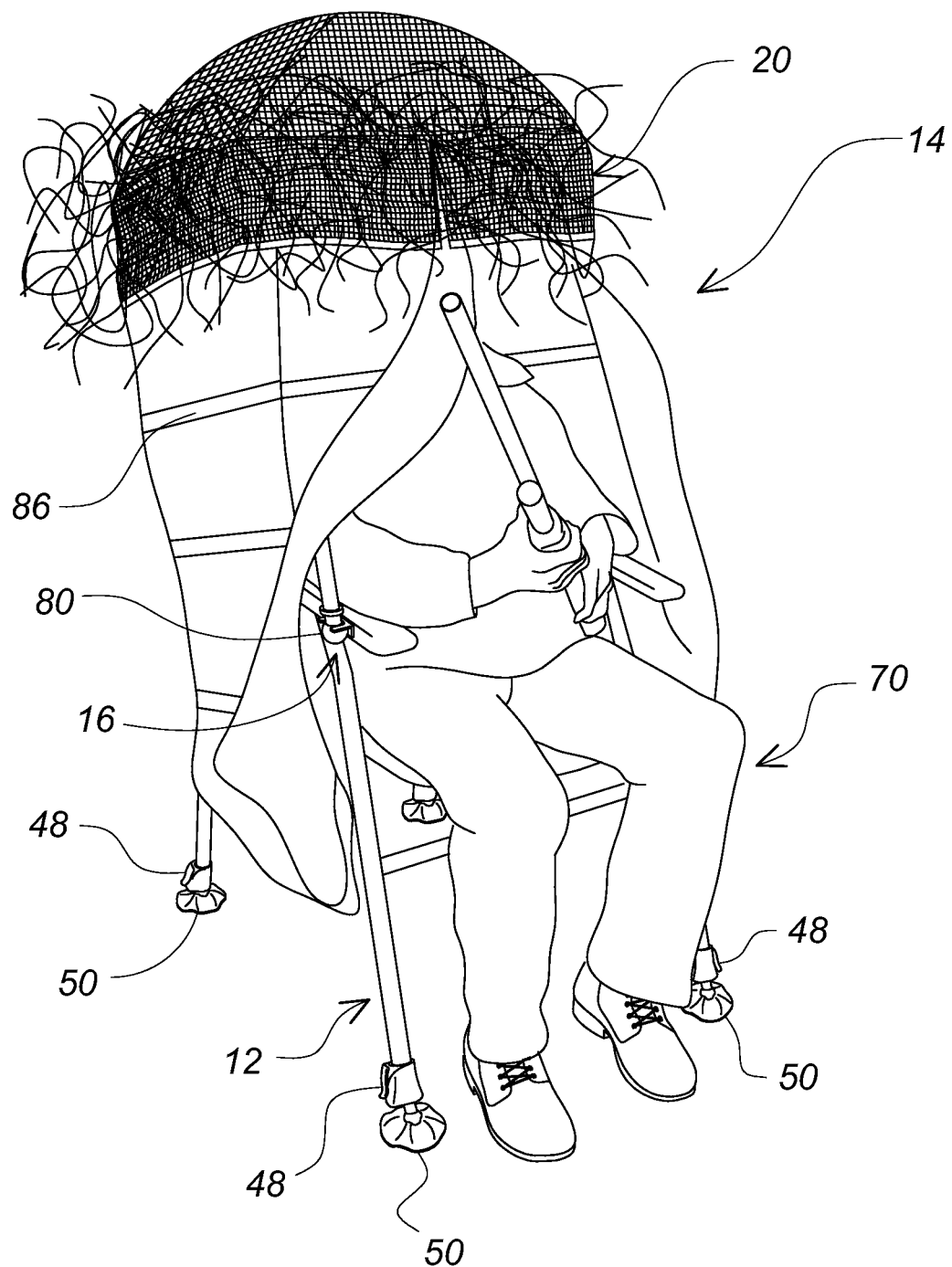
FIG. 2 shows a hunter concealed in the blind and triggering the quick release mechanism for the canopy frame.
Figure 3:
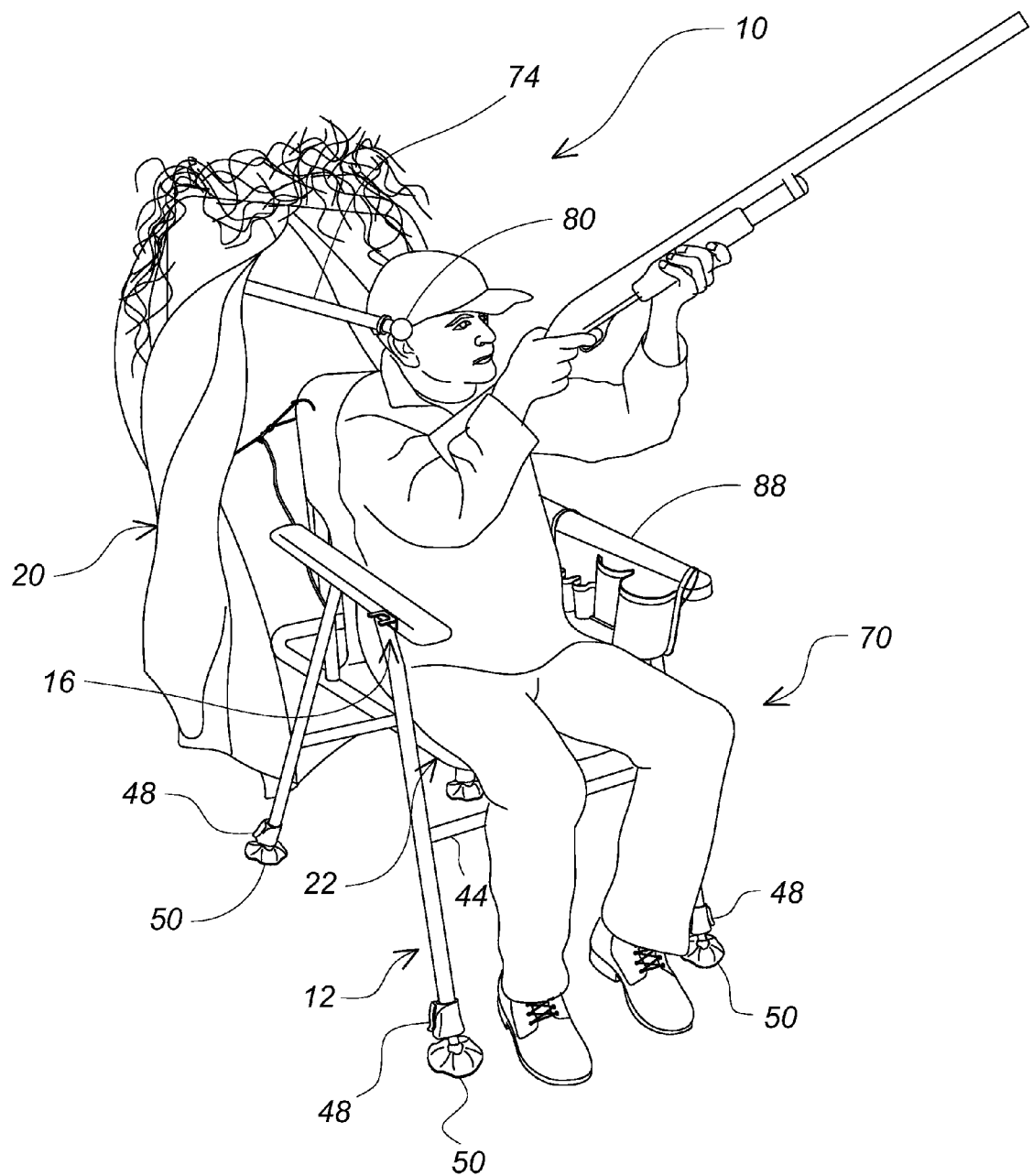
FIG. 3 shows the hunter making a shot from a seated position with the canopy frame and the attached cover pivoted out of the way.

In use as illustrated in FIGS. 2-3, cover 20 is draped over canopy frame 14 such that it covers U-shaped top 52 and envelopes chair 12 and user 70 seated in the chair. A slit 84 is provided in the front of cover 20 such that user 70 may get in and out of fully erected blind 10. Cover 20 may have a camouflage pattern and be treated with a coating, such as polyurethane, to make the cover waterproof. The portion of cover 20 draped over dome support rods 64 and part way down the sides may be formed of mesh such that user 70 is concealed but may be able to view the surrounding area. Bands 86 may be provided on cover 20 for use in attaching grasses, stalks or the like to better camouflage the blind. Cover 20 may be attached to canopy frame 14 using such attachment mechanisms as hook and pile fasteners, button snaps, etc. Attachment of cover 20 to canopy frame 14 is particularly important when blind 10 is used for hunting waterfowl as it is desirable that cover 20 not be thrown into the water when spring member 18 is released and U-shaped support 54 and top 52 are rotated upwardly and backwardly as shown in FIG. 6.

A strap (not shown) may be provided on portable hunting blind 10 such that it may be carried by a hunter in folded condition as shown in FIG. 7 to a location presently favored by birds of the kind which are the object of the hunt. In shallow water, chair legs 26, 28 may be adjusted such that hunter 70 is comfortably seated above the water. Cover 20 conceals hunter 70 but permits the hunter to view his surroundings through the mesh portion of cover 20 as part of the enjoyment of a hunt (FIG. 2). When the opportunity arises to make a shot, hunter 70 may trigger release mechanism 16 (FIG. 2) with his arm which releases canopy frame 14. In the same moment, hunter 70 may raise his gun and take a shot (FIG. 3).

For further comfort and as shown in FIG. 9, a pouch 88 may be provided on arm rest 38 with holders 90, 92 for duck or goose calls and a beverage, respectively. A second pouch 94 as shown in FIG. 10 may be provided on opposite arm rest 38 for shells and another pouch (not shown) may be attached behind U-shaped backrest 24 for birds which have been retrieved.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

What is claimed:

1. A portable hunting blind comprising a chair, a canopy frame, a spring, a release mechanism and a cover,
    said chair having a seat, a backrest, arm rests and front and rear chair legs, said seat and back formed of U-shaped members having a base and legs and said legs of the backrest connected to the legs of the seat forward of the base of the seat;
    said canopy frame having a support and a top formed of U-shaped members having a base and legs, said legs of the support joined to the legs of the backrest, said legs of the top joined to the legs of the support near the base of the support to form a hoop;
    said spring interconnecting the base of the seat and the support, said spring being in tension when the support is pivoted upwardly such that it is generally in line with the backrest and the top is pivoted such that it is generally normal to the support and positioned above the seat;
    said release mechanism including a support rod pivoted to the top and a latch on one of the arm rests, said latch holding the spring in tension when locked onto a free end of the support rod;
    said cover draped over the canopy frame to envelope the canopy frame and the chair
    whereby a user seated in the chair may release the latch by pushing against the rod with his arm thus releasing the spring to rotate the canopy frame backwardly so that the cover draped top is no longer above the seat.

2. The portable hunting blind of claim 1 wherein a pair of overlapping dome support rods are pivoted in the hoop formed by the top and the base of the support and the cover draped over the dome support rods is formed of mesh such that the user may view his surroundings through the mesh.

3. The portable hunting blind of claim 1 wherein the support rod pivoted to the top is generally parallel to the spring interconnecting the base of the seat and the support when the spring is in tension.

4. The portable hunting blind of claim 1 wherein the front and rear chair legs, the legs of the U-shaped support and the support rod are independently adjustable in length.

5. The portable hunting blind of claim 1 wherein a cross brace interconnects the legs of the U-shaped support near the base of the support, said base of the U-shaped seat providing a first attachment point for the spring and the cross brace between the legs of the U-shaped support providing a second attachment point for the spring.

6. A portable hunting blind comprising a chair, a canopy frame, a spring, a release mechanism and a cover, said chair having a seat, a backrest, arm rests and front and rear legs, said seat and backrest formed of U-shaped tubular members having a generally flat base and legs joined at generally right angles to the base; said legs of the back connected to the legs of the seat forward of the base of the seat;

said canopy frame having a support and a top formed of U-shaped tubular members having a generally flat base and legs joined at generally right angles to the base, said legs of the support joined by a cross brace and to the legs of the backrest below the base of the backrest, said legs of the top joined to the legs of the support near the base of the support to form a hoop within which a pair of support rods are pivoted;

said spring interconnecting the base of the seat and the cross brace between the legs of the support, said spring being in tension when the support is pivoted upwardly such that it is generally in line with the backrest and the top is pivoted such that it is generally normal to the support and positioned above the seat;

said release mechanism including a support rod pivoted to the top and a latch on one of the arm rests, said latch having a throat normal to the arm rest into which a ball on a free end of the support rod is received holding the spring in tension;

said cover draped over the canopy frame to envelope the canopy frame and the chair whereby a user seated in the chair may unseat the ball from the throat of the latch by pushing against the rod with his arm or elbow causing the canopy frame to be rotated backwardly by the spring and the top to be no longer above the seat.

7. The portable hunting blind of claim 6 wherein a safety strap connects the base of the backrest and the cross-brace between the legs of the support for stopping rotation of the legs of the support about the legs of the backrest at less than 180 degrees such that the U-shaped top cover and cover are kept out of water.

8. The portable hunting blind of claim 6 wherein the cover has bands on the outside of the cover for attachment of grass or stalks.

9. The portable hunting blind of claim 6 wherein the legs of the backrest nest inside the legs of the seat and the legs of the support nest inside the legs of the top.

10. The portable hunting blind of claim 9 wherein the front and rear chair legs on right and left sides of the chair are pivotally connected at their upper ends to the arm rest by a hinge fitting.

* * * * *